United States Patent
Palanisamy (10) Patent No.: US 10,666,866 B1
(45) Date of Patent: May 26, 2020

(54) DATA UNIT FEED SYNCHRONIZATION TO MULTIPLE PIPELINES

(71) Applicant: Ambarella International LP, Santa Clara, CA (US)

(72) Inventor: Kumarasamy Palanisamy, San Jose, CA (US)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 16/215,927

(22) Filed: Dec. 11, 2018

Related U.S. Application Data (63) Continuation of application No. 14/831,187, filed on Aug. 20, 2015, now Pat. No. 10,178,310.

(51) Int. Cl.
*H04N 5/232* (2006.01)

(52) U.S. Cl.
CPC ..... *H04N 5/23241* (2013.01); *H04N 5/23225* (2013.01)

(58) Field of Classification Search
CPC .............. H04N 5/23241; H04N 5/23225
See application file for complete search history.

(56) References Cited

U.S. PATENT DOCUMENTS

| | | | | |
|---|---|---|---|---|
| 5,450,549 A * | 9/1995 | Casparian | ................. | G09G 5/39 345/531 |
| 6,826,752 B1 | 11/2004 | Thornley | ....................... | 718/100 |
| 7,016,998 B2 * | 3/2006 | Mukherjee | ............ | G06F 3/1438 345/504 |
| 7,561,590 B1 * | 7/2009 | Walsh | ..................... | H04L 47/10 370/416 |
| 7,633,971 B1 * | 12/2009 | Butler | ................... | H04L 67/025 370/419 |
| 8,595,389 B2 * | 11/2013 | Davis | .................. | G06F 9/30145 710/100 |
| 2002/0146023 A1 | 10/2002 | Myers | .......................... | 370/412 |
| 2004/0187118 A1 * | 9/2004 | Blainey | .................... | G06F 9/52 718/100 |
| 2005/0198601 A1 | 9/2005 | Kuang | .......................... | 716/108 |
| 2005/0283783 A1 * | 12/2005 | DeSota | ................ | G06F 9/3851 718/100 |
| 2009/0328041 A1 | 12/2009 | Sudzilouski | .................. | 718/100 |

(Continued)

OTHER PUBLICATIONS

Tanenbaum, "Structured Computer Organization", Third Edition, 1990, Prentic Hall, pp. 10-12.

*Primary Examiner* — Tim T Vo
*Assistant Examiner* — Harry Z Wang
(74) *Attorney, Agent, or Firm* — Christopher P. Maiorana, PC (57) ABSTRACT

An apparatus includes an interface and a circuit. The interface may be connectable to (i) a plurality of counters and (ii) multiple pipelines. The circuit may be configured to (i) increment two or more given counters of the counters associated with a plurality of first data units in response to the first data units being available in a buffer, where two or more of the pipelines each (a) reads a plurality of current units from the first data units and (b) decrements a respective one of the given counters in response to each read of one of the current units, (ii) monitor the decrements of the given counters and (iii) block a second data unit from being copied into the buffer until all of the given counters indicate that the buffer has room to hold the second data unit.

18 Claims, 9 Drawing Sheets

(56) References Cited

U.S. PATENT DOCUMENTS

| | | | |
|---|---|---|---|
| 2014/0282564 A1* | 9/2014 | Almog | G06F 9/522 718/102 |
| 2016/0048394 A1* | 2/2016 | Vorbach | G06F 8/443 712/32 |

* cited by examiner

DATA UNIT FEED SYNCHRONIZATION TO MULTIPLE PIPELINES

This application relates to U.S. Ser. No. 14/831,187, filed Aug. 20, 2015, which is incorporated by reference in its entirety.

FIELD OF THE INVENTION

The present invention relates to pipelined processors generally and, more particularly, to data unit feed synchronization to multiple pipelines.

BACKGROUND OF THE INVENTION

Conventional video camera circuits with high dynamic range processing capabilities store data of one or more video frames to a dynamic random access memory. The data is subsequently read from the memory and distributed to multiple image processor pipeline sections simultaneously, with varying skews across the pipeline sections. Typical low power camera systems are designed to reduce the number of accesses to the memory to conserve power. Wearable high performance camera systems are designed to reduce the number of accesses to the memory to conserve memory bandwidth.

It would be desirable to implement data unit feed synchronization to multiple pipelines.

SUMMARY OF THE INVENTION

The present invention concerns an apparatus including an interface and a circuit. The interface may be connectable to (i) a plurality of counters and (ii) multiple pipelines. The circuit may be configured to (i) increment two or more given counters of the counters associated with a plurality of first data units in response to the first data units being available in a buffer, where two or more of the pipelines each (a) reads a plurality of current units from the first data units and (b) decrements a respective one of the given counters in response to each read of one of the current units, (ii) monitor the decrements of the given counters and (iii) block a second data unit from being copied into the buffer until all of the given counters indicate that the buffer has room to hold the second data unit.

The objects, features and advantages of the present invention include providing data unit feed synchronization to multiple pipelines that may (i) synchronize the data feeds to the pipelines, (ii) work with existing camera architectures, (iii) scale to any number of pipelines, (iv) be reconfigurable, (v) free a processor from monitoring data unit processing by the pipelines, (vi) allow the pipelines to share data units with varying skews with respect to each other and/or (vii) be implemented as part of a digital camera.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Various embodiments of the present invention generally provide a scalable and configurable hardware synchronization counter feeder mechanism. In a digital camera application (e.g., a digital still camera, a digital video camera and a hybrid digital video/still camera), the feeder mechanism may function as a pseudo producer/feeder to multiple image processor pipeline sections that may read and use the same video frame data. The feeder mechanism generally synchronizes and shares a single dynamic random access memory (e.g., DRAM) read data stream across the multiple pipeline sections. The feeder mechanism may eliminate redundant reads from the DRAM of the same data by different pipeline sections and so generally reduces an overall power consumption. Elimination of the redundant reads from the DRAM may also free up more bandwidth of the DRAM for use by other processors on the chip and so enables higher performance.

Figure 1:
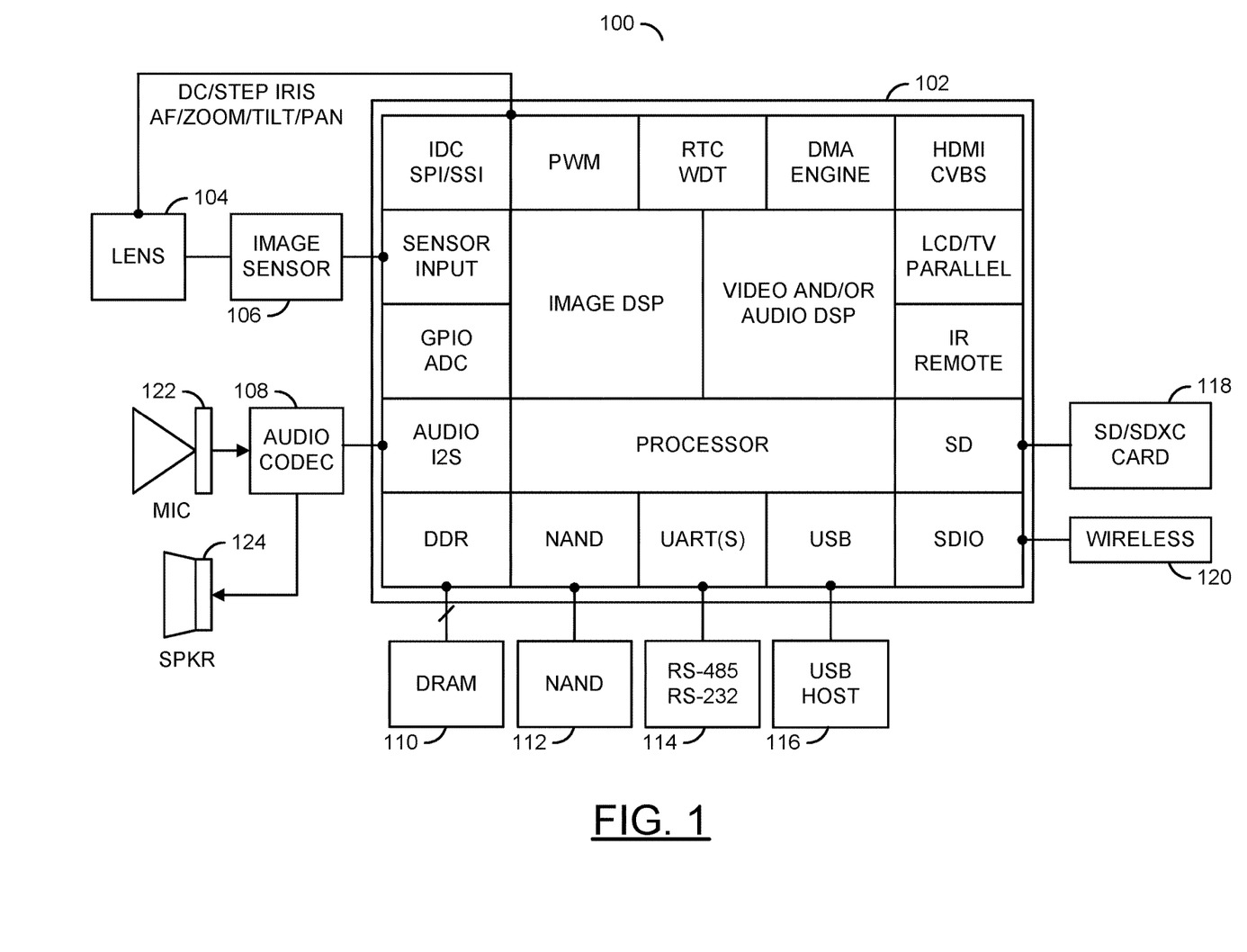
FIG. 1 is a block diagram of a camera system.

Referring to FIG. 1, a block diagram of a camera system 100 is shown illustrating an example implementation of a camera/recorder system (or apparatus). In some embodiments, the camera system 100 may be a digital video camera, a digital still camera or a hybrid digital video/still camera. In an example, the electronics of the camera system 100 may be implemented as one or more integrated circuits. For example, an application specific integrated circuit (e.g., ASIC) or system-on-a-chip (e.g., SOC) may be used to implement a processing portion of the camera system 100. In various embodiments, the camera system 100 may comprise a camera chip (or circuit) 102, a lens assembly 104, an image sensor 106, an audio codec 108, dynamic random access memory (e.g., DRAM) 110, nonvolatile memory (e.g., NAND flash memory, NOR flash memory, etc.) 112, one or more serial interfaces 114, an interface 116 for connecting to or acting as a universal serial bus (e.g., USB) host, an interface for connecting to a removable media 118 (e.g., SD—secure digital media, SDXC—secure digital extended capacity media, etc.), a wireless interface 120 for communicating with a portable user device, a microphone 122 for recording audio, and a speaker 124 for playing audio. In some embodiments, the lens assembly 104 and the image sensor 106 may be part of a separate camera connected to the processing portion of the system 100 (e.g., via a video cable, a high definition media interface (e.g., HDMI) cable, a USB cable, an Ethernet cable, or wireless link).

In various embodiments, the circuit 102 may comprise a number of modules (or circuits) including, but not limited to, a pulse width modulation (e.g., PWM) module, a real time clock and watchdog timer (e.g., RTC/WDT), a direct memory access (e.g., DMA) engine, a high-definition multimedia interface (e.g., HDMI), an LCD/TV/Parallel interface, a general purpose input/output (e.g., GPIO) and an analog-to-digital converter (e.g., ADC) module, an infrared (e.g., IR) remote interface, a secure digital input output (e.g., SDIO) interface module, a secure digital (e.g., SD) card interface, an audio inter-IC sound (e.g., I2S) interface, an image sensor input interface, and a synchronous data communications interface (e.g., IDC SPI/SSI). The circuit 102 may also include an embedded processor (e.g., ARM, etc.), an image digital signal processor (e.g., DSP), and a video and/or audio DSP. In embodiments incorporating the lens assembly 104 and image sensor 106 in the system 100, the circuit 102 may be configured (e.g., programmed) to control the lens assembly 104 and receive image data from the sensor 106. The wireless interface 120 may include support for wireless communication by one or more wireless protocols such as Bluetooth®, ZigBee®, Institute of Electrical and Electronics Engineering (e.g., IEEE) 802.11, IEEE 802.15, IEEE 802.15.1, IEEE 802.15.2, IEEE 802.15.3, IEEE 802.15.4, IEEE 802.15.5, and/or IEEE 802.20. The circuit 102 may also include support for communicating using one or more of the universal serial bus protocols (e.g., USB 1.0, 2.0, 3.0, etc.). The circuit 102 may also be configured to be powered via the USB connection. However, other communication and/or power interfaces may be implemented accordingly to meet the design criteria of a particular implementation.

In various embodiments, programming code (e.g., executable instructions for controlling various processors and encoders of the circuit 102) may be stored in one or more of the memories 110 and 112. When executed by the circuit 102, the programming code generally causes one or more processors in the circuit 102 to configure the feeder mechanism and start video frame processing operations. The resulting compressed video signal may be presented to the SD/SDXC card 118, and/or the wireless interface 120, and/or the USB interface 116.

Figure 2:
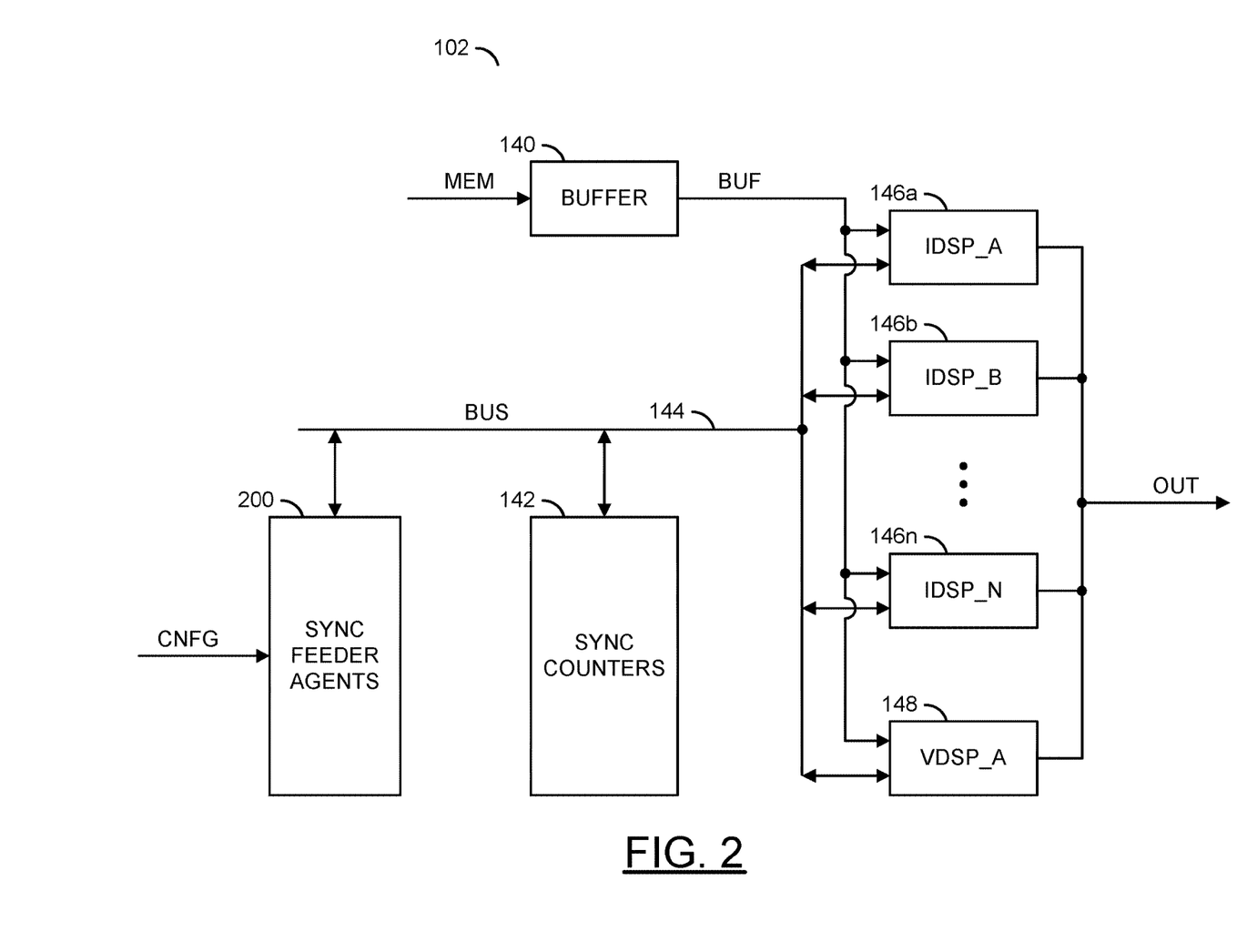
FIG. 2 is a block diagram of a portion of a camera chip in accordance with a preferred embodiment of the present invention.

Referring to FIG. 2, a block diagram of a portion of the circuit 102 is shown in accordance with a preferred embodiment of the present invention. The circuit 102 generally comprises a block (or circuit) 140, a block (or circuit) 142, a channel (or bus) 144, multiple blocks (or circuits) 146a-146n, one or more blocks (or circuits) 148 and a block (or circuit) 200. The circuits 140-148 and 200 may be implemented in hardware, software, firmware or any combination thereof in an apparatus (or device).

A signal (e.g., CNFG) may be received by the circuit 200. The signal CNFG may carry configuration information to configure the circuit 200. A signal (e.g., MEM) may be received by the circuit 140. The signal MEM may convey data between the memory 110 and the circuit 140. The circuit 140 may generate a signal (e.g., BUF) transferred to the circuits 146a-146n and the circuit 148. The signal BUF generally presents buffered data from the circuit 140 to the circuits 146a-146n and 148. A signal (e.g., OUT) may be generated and presented by one or more of the circuits 146a-146n and 148.

The circuit 140 may implement a buffer circuit. The circuit 140 is generally operational to buffer video pictures (e.g., images, frames, fields) received from the memory 110 and consumed by the circuits 146a-146n and 148. A size of the circuit 140 is generally designed to hold multiple data units concurrently.

The circuit 142 may implement a synchronization counter circuit. The circuit 142 is generally operational to run multiple counters in parallel and independently of each other. Each counter may be used to track the status of a respective pipeline processing a data unit buffered in the circuit 140. While the counter has a "busy" value (e.g., a non-zero value), the corresponding data unit is still being processed by the respective pipeline. Once all of the counters associated with a data unit have a "done" value (e.g., a zero value), all of the circuits 146a-146n and 148 may be finished with the data unit and the space may be recycled in the circuit 140.

The bus 144 may implement a shared communication bus. The bus 144 is generally operational to transfer commands, requests and other signals among the circuits 142, 146a-146n, 148 and 200. In various embodiments, the bus 144 may be implemented as a single bidirectional bus. In other embodiments, the bus 144 may be implemented as multiple buses.

The circuits 146a-146n may implement multiple image digital signal processor (e.g., IDSP) pipeline sections. The pipelines 146a-146n may be part of the image DSP shown in FIG. 1. Each pipeline 146a-146n may be operational to process the data units stored in the circuit 140. The processed data may be presented in the signal OUT. In some embodiments, each pipeline 146a-146n may be implemented as a hardware pipeline. In other embodiments, each pipeline 146a-146n may be implemented as a software pipeline. Other designs of the pipelines 146a-146n may be implemented to meet the design criteria of a particular application.

The circuits 148 (a single circuit shown) may implement a video digital signal processor (e.g., VDSP) pipeline. The pipelines 148 may be part of the video DSP shown in FIG. 1. The pipelines 148 may be operational to process the data units stored in the circuit 140. The processed data may be presented in the signal OUT. In some embodiments, the pipelines 148 may be implemented as hardware pipelines. In other embodiments, the pipelines 148 may be implemented as software pipelines. Other designs of the pipelines 148 may be implemented to meet the design criteria of a particular application.

The circuit 200 may implement the synchronization counter feeder mechanism circuit. The circuit 200 is generally operational to function as a pseudo producer/feeder mechanism that synchronizes the presentation of data units in the circuit 140 to the pipelines 146a-146n and 148 for consumption. The circuit 200 generally controls one or more parallel streams of data units from the memory 110 through the circuit 140 to the pipelines 146a-146n and/or 148. In various embodiments, the circuit 200 may be implemented only in hardware.

Figure 3:
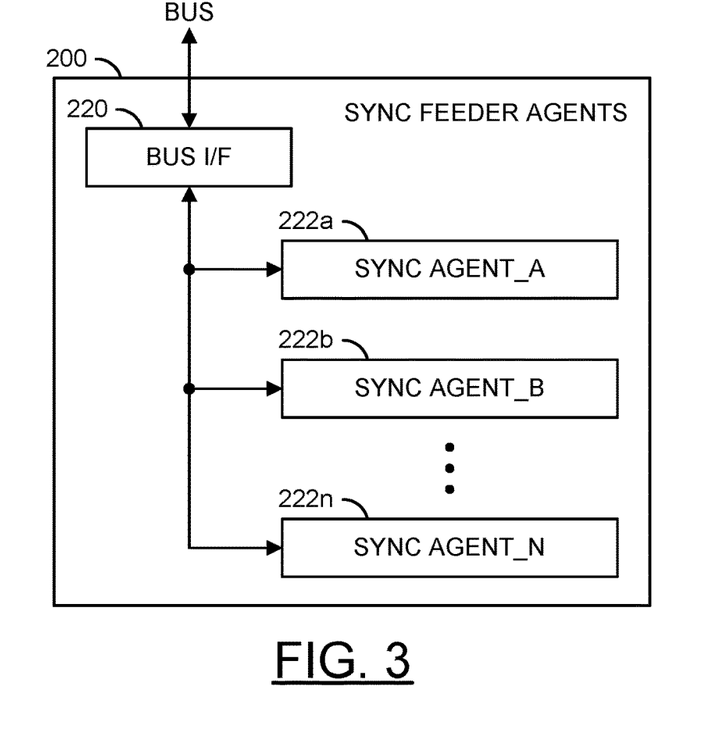
FIG. 3 is a block diagram of a synchronization feeder circuit.

Referring to FIG. 3, a block diagram of an example implementation of the circuit 200 is shown. The circuit (or apparatus) 200 generally comprises a block (or circuit) 220 and multiple blocks (or circuits) 222a-222n. The circuits 220-222n may be implemented in hardware, software, firmware or any combination thereof in an apparatus (or device). In various embodiments, the circuits 220-222n may be implemented only in hardware.

The circuit 220 may implement a bus interface circuit. The circuit 220 is generally operational to communicate over the bus 144 with the circuit 142 and the pipelines 146a-146n and/or 148. In some embodiments, the circuit 220 may include registers used to configure the circuit 200.

The circuits 222a-222n may implement synchronization agent circuits. Each circuit 222a-222n may be configured to control a stream of data units from the memory 110 through the circuit 140 to the pipelines 146a-146n and/or 148. Adjustable configuration parameters of the circuits 222a-222n may include, but are not limited to, identification values, multiple enable bits, and multiple synchronization counter numbers 162a-162n associated the pipelines 146a-146n and 148.

Figure 4:
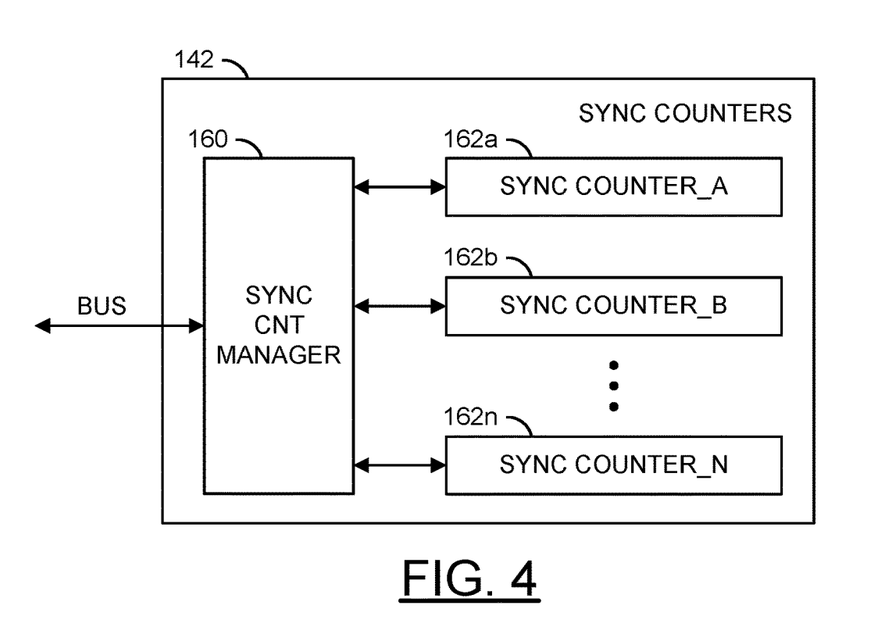
FIG. 4 is a block diagram of a counter circuit.

Referring to FIG. 4, a block diagram of an example implementation of the circuit 142 is shown. The circuit 142 generally comprises a block (or circuit) 160 and multiple blocks (or circuits) 162a-162n. The circuit 160-162n may be implemented in hardware, software, firmware or any combination thereof in an apparatus (or device).

The circuit 160 may implement a synchronization counter manager circuit. The circuit 160 is generally operational to communicate over the bus 144 with the circuit 200 and the pipelines 146a-146n and/or 148. The circuit 160 may be operational to program, increment, decrement and reset counters in the circuits 162a-162n.

The circuits 162a-162n may implement synchronization counter circuits. Each circuit 162a-162n is generally operational to count up and down based on commands received from the circuit 160. Each circuit 162a-162n may also be configured to accept an initial count value other than zero. Each circuit 162a-162n may be individually programmable (e.g., by the embedded software) with a maximum count value (e.g., usually a unit (e.g., one) less than the number of allocated buffer units).

Whenever the manager circuit 160 receives an increment-wait request (or message) from the circuit 200 for a selected counter circuit 162a-162n, the circuit 160 initially checks whether the increment-wait request would cause the selected counter circuit 162a-162n to exceed the programmed maximum value. If the manager circuit 160 determines that the increment may not result in the selected counter circuit 162a-162n exceeding the programmed maximum, the selected counter circuit 162a-162n may be allowed to perform the increment operation and return the wake instruction to the requester circuit 222a-222n. Otherwise the increment-wait request may be put in a pending/wait state and the wake instruction (or message) delayed until the above condition is satisfied. A corresponding pipeline 146a-146n and 148 may send one or more decrement requests (or messages) on the selected counter circuit 162a-162n causing the counter value to decrease such that the pending increment may not cause the counter value to exceed the programmed maximum. The increment-wait request in the wait state generally does not block any decrement requests (e.g., usually from a consuming pipeline section/input stream) from performing the decrement operation. The selected counter circuit 162a-162n may return a wake instruction for the increment-wait request to the requester in the circuit 200 after completing the increment operation.

Whenever a given counter circuit 162a-162n receives a receive-wait request (or message), the manager circuit 160 may check whether the count value of the given counter circuit 162a-162n is greater than (e.g., usually >0) the value specified in the request. In various embodiments, a default value in the request may be zero. If the given counter value is greater than the value specified in the request, the given counter circuit 162a-162n may return the wake instruction back to the requester. Otherwise, the receive-wait request may be put in a pending/wait state until the circuit 200 performs one or more increment-wait requests on the given counter circuit 162a-162n such that the given counter value becomes greater than the requested value. When the given counter value becomes greater than the requested value, the given counter circuit 162a-162n may returns a wake instruction back to the requester (e.g., usually and input stream of a section pipeline). In some embodiments, the default value specified in the receive-wait requests may be zero. Hence, the given counter circuit 162a-162n generally returns the wake instruction as soon as the counter value becomes greater than zero.

The decrement requests generally results in a decrement of the counter value where the counter value is greater than zero. If the decrement request would result in the counter value to be less than zero, the counter value may be floored at the minimum value (e.g., zero). In various embodiments, the counter value may never become negative.

Figure 5:
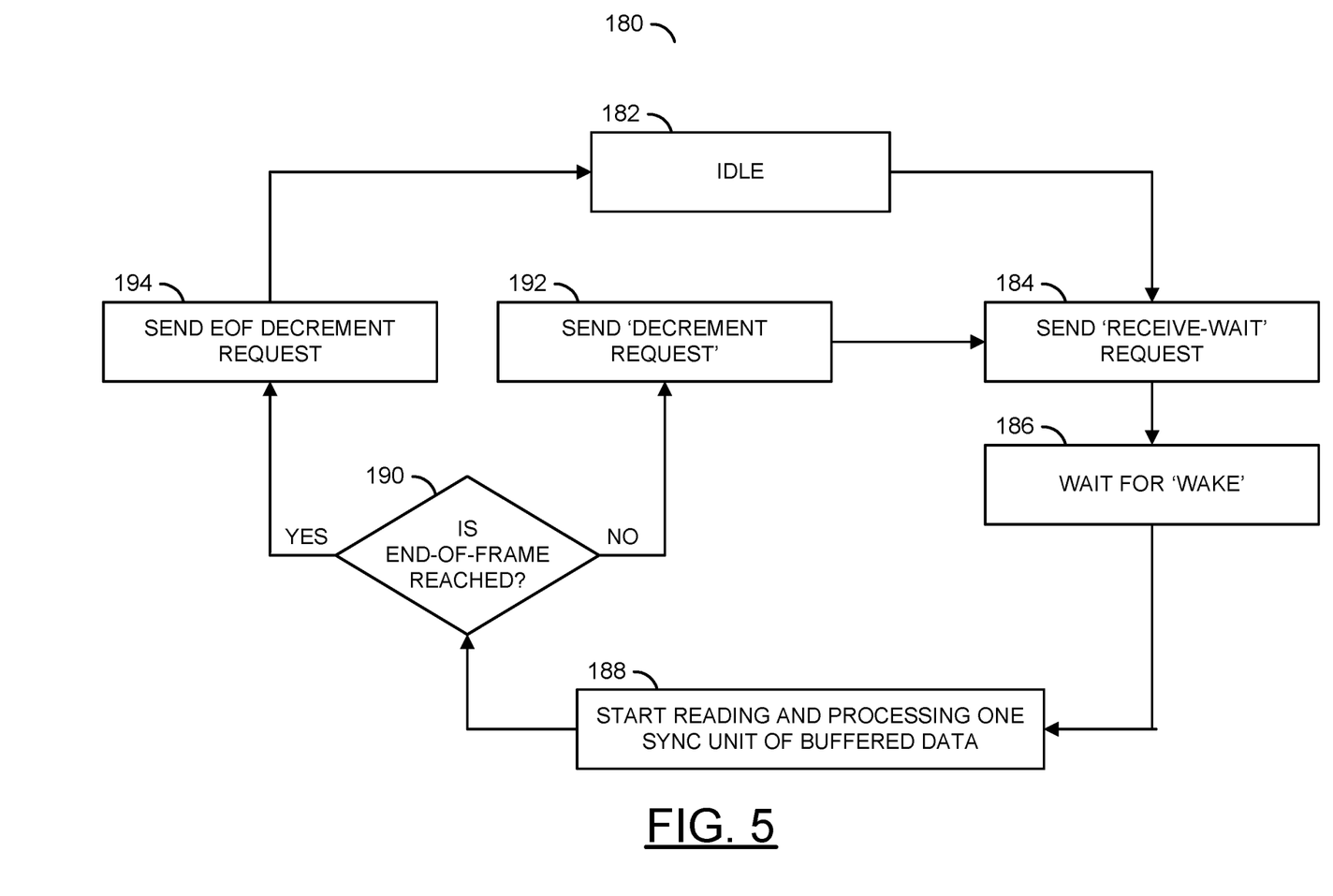
FIG. 5 is a functional flow diagram of a pipeline operation.

Referring to FIG. 5, a functional flow diagram of an example pipeline method of operation 180 is shown. The method 180 may be implemented in each of the pipelines 146a-146n and 148. The method (or process) 180 generally comprises a step (or state) 182, a step (or state) 184, a step (or state) 186, a step (or state) 188, a decision step (or state) 190, a step (or state) 192 and a step (or state) 194. The steps 182-194 may be implemented in hardware, software, firmware or any combination thereof in an apparatus (or device).

In the step 182, a target pipeline (e.g., 146d) among the pipelines 146a-146n and 148 may start in an idle state. When commanded to process data, the target pipeline 146d may send a receive-wait request in the step 184 to the corresponding counter circuit 162a-162n. In the step 186, the target pipeline 146d may wait for the wake instruction from the corresponding counter circuit 162a-162n.

Upon receiving the wake instruction, the target pipeline 146d may being reading a unit of buffered data from the circuit 140 and process the unit. If the unit is determined not to be at an end-of-frame position in the decision step 190, the target pipeline 146d may send a decrement request on the bus 144 in the step 192. Thereafter, the target pipeline 146d may send another receive-wait request in the step 184. The loop around the steps 184-192 may continue until an end-of-frame is detected in the decision step 190. The target pipeline 146d may send an end-of-frame decrement request in the step 194. Afterwards, the target pipeline 146d generally returns to the idle state in the step 182.

Figure 6:
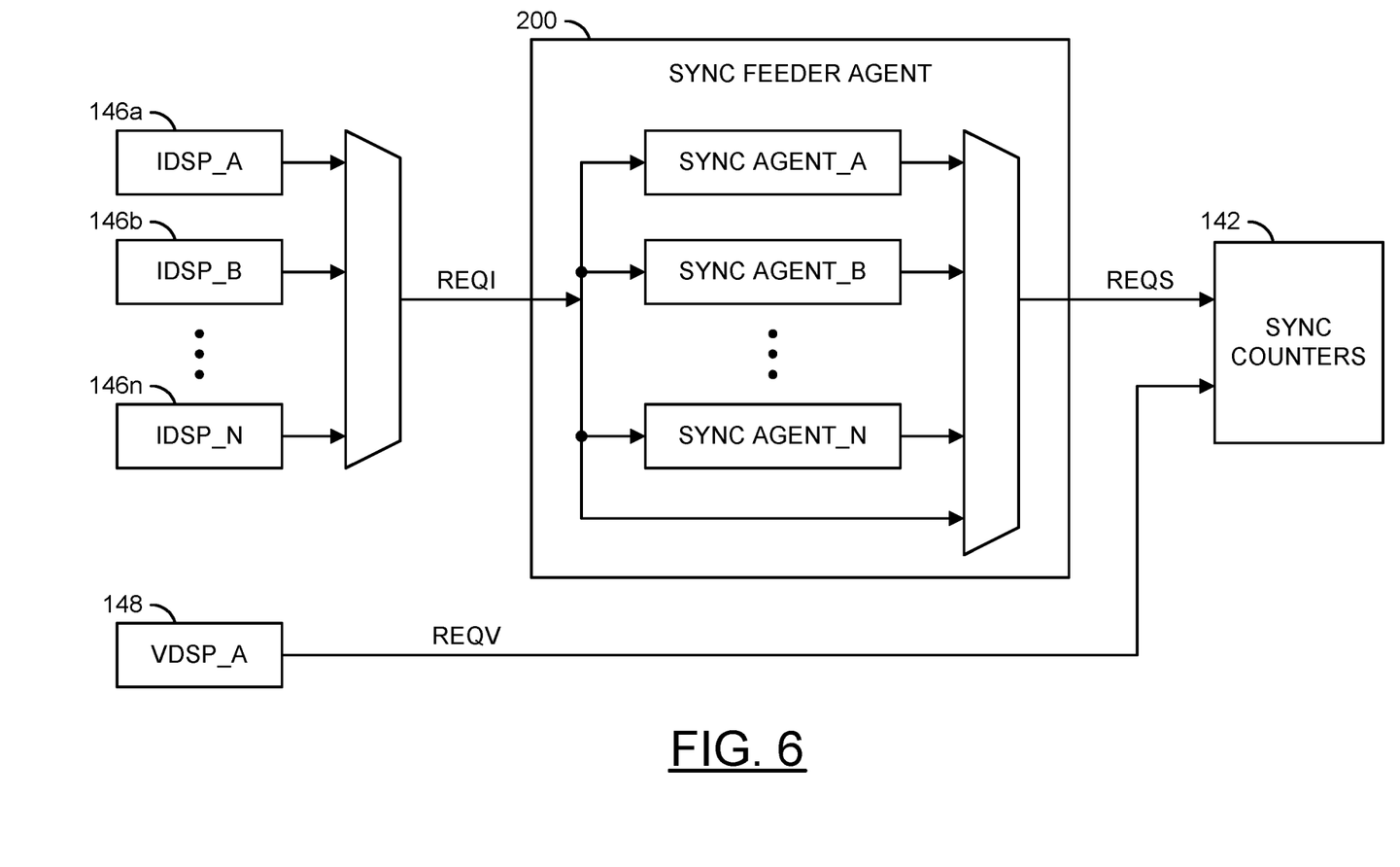
FIG. 6 is a functional flow diagram of a snooping operation.

Referring to FIG. 6, a functional flow diagram of an example snooping operation of the circuit 200 is shown. In various embodiments of the present invention, software executing in the circuit 102 generally allocates one or more synchronization data unit amounts to the on-chip stream buffer circuit 140. The software may cause one or more synchronization unit amounts of data to be prefetched from the memory 110 into the circuit 140. Furthermore, the software generally configures each input stream of the target pipelines 146a-146n (e.g., the pipelines 146a-146d) to use a dedicated semaphore/synchronization counter in the circuit 142 to synchronize the input data. The software may also configure one or more of the circuits 222a-222n to snoop and operate on target circuits 162a-162n linked to the receiving pipeline sections/input streams of the pipelines 146a-146n and 148. Once the circuit 200 is configured and enabled, the circuit 200 generally sends initial increment-wait requests (also known as send-wait requests) on the bus 144 in the signal REQS to all of the target circuits 162a-162n.

The circuit 200 may start snooping on the bus 144 for any synchronization counter decrement requests on the bus 144 in the signal REQI. The decrement requests are generally transferred through the circuit 200 to target circuits 162a-162n (the counters linked with the respective target pipelines 146a-146n that consume the data). The circuit 200 may act as the pseudo producer by presenting additional increment-wait requests to all of the target circuits 162a-162n whenever all of the input streams consume a single sync unit amount of data and issue additional decrement requests to the circuit 200. The circuit 200 may monitor the decrement requests and relay the decrement requests to the target circuits 162a-162n in the signal REQS.

The target pipelines 146a-146n that process (or consume) the data units may issue the receive-wait requests to the circuit 200 in the signal REQI. The circuit 200 may relay the receive-wait requests to the target circuits 162a-162n in the signal REQS. The target pipelines 146a-146n may wait until the target circuits 162a-162n to return the wake instructions (or signals) before processing a new unit of data from the circuit 140.

An increment-wait request generally causes a circuit 162a-162n to be incremented by a unit value (e.g., typically 1) to show that unprocessed data is available in the circuit 140. The incrementing may reach a wait condition when the count value reaches a maximum value. A decrement request generally causes the counter value to be reduced by a unit value because an existing data unit has been consumed and the circuit 140 is free to reuse the space occupied by that data unit. A new receive-wait request may be issued by a consuming target pipeline 146a-146n whenever the consuming target pipeline wants to read/consume next data unit (e.g., next data buffer). The new receive-wait request may be issued as soon as the decrement request is issued for the previous data. The target pipelines 146a-146n may wait after issuing the receive-wait commands until the wake instructions are returned. The receiving counters 162a-162n may check the values specified in the receive-wait requests (e.g., usually zero) and return the wake instructions back to the requesting target pipelines 146a-146n as soon as the corresponding counter values are greater (e.g., usually one) than the value specified in the receive-wait request. Upon receiving the wake instructions, the target pipelines 162a-162n may infer that the corresponding counter values are greater than zero or the specified value in the receive-wait requests. Therefore, the requested data units may be already available in the circuit 140.

Figure 7:
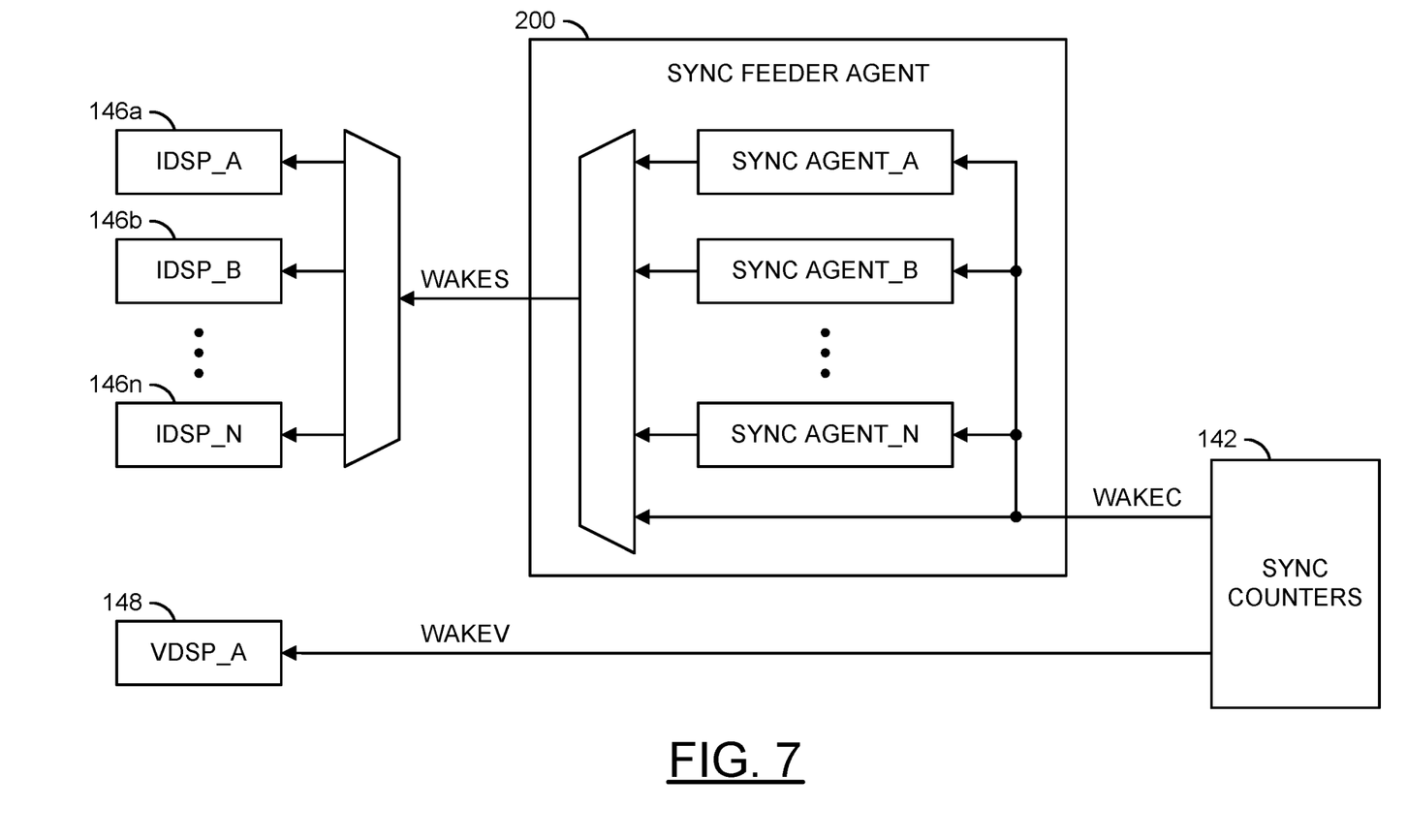
FIG. 7 is a functional flow diagram of a wake operation.

Referring to FIG. 7, a functional flow diagram of an example wake operation of the circuit 200 is shown. The circuit 142 may generate the wake instructions (or signals) when the corresponding counter value becomes greater than or matches the amount specified in the request (e.g., usually a single data unit amount). The wake instructions may be received by the circuit 200 either at different times or simultaneously. The wake instructions may be presented on the bus 144 to the circuit 200 in a signal (e.g., WAKEC). The circuit 200 generally relays the wake instructions to the requesting pipelines 146a-146n in a signal (e.g., WAKES) via the bus 144. The wake instructions in the signal WAKEV may be presented to the pipeline 148.

The wake instructions from the circuit 142 may guarantee that one or more of the requested synchronization unit amounts of data are available in the circuit 140 for the requesting pipelines 146a-146n to access. Once the requesting pipelines 146a-146n receive the wake instruction signals, the requesting pipelines 146a-146n may start reading and processing the data from the circuit 140. The requesting pipelines 146a-146n may perform a decrement request after processing a synchronization unit amount of input data from the circuit 140.

Whenever the decrement counts of all the enabled/tracked circuits 162a-162n indicate the busy condition (e.g., a non-zero value), a corresponding circuit 222a-222n (e.g., 222c) generally acts as the pseudo producer to all the input streams that share the same DRAM data stream. The corresponding circuit 222a-222n may be configured to work with the tracked circuits 162a-162n and the tracked pipelines 146a-146n and 148. The corresponding circuit 222a-222n may issue a series of increment requests to all of the target circuits 162a-162n to increment the target counter values by the same amount (except end-of-frame decrement requests).

All input stream channels of the target pipelines 146a-146n that share the same input data unit may be configured to point to a stream channel in the circuit 140. A single input stream channel of a single target pipeline 146a-146n may be designated as a master channel and programmed to fetch data into the on-chip buffer circuit 140 from the off-chip memory 110. Since all of the channels, except the master channel, generally do not have a DRAM data read enabled, the non-master channels may feed from the same data fetched by the master channel into the circuit 140. Since the corresponding circuit 222a-222n may increment the target circuits 162a-162n after all of the input streams request decrements of the respective target counts (including the count used by the master stream), buffer overrun situations and/or buffer under run situations may be avoided for all of the input streams that share the data while allowing the target pipelines 146a-146n to run with different skews with respect to each other by the allocated buffer size.

Figure 8:
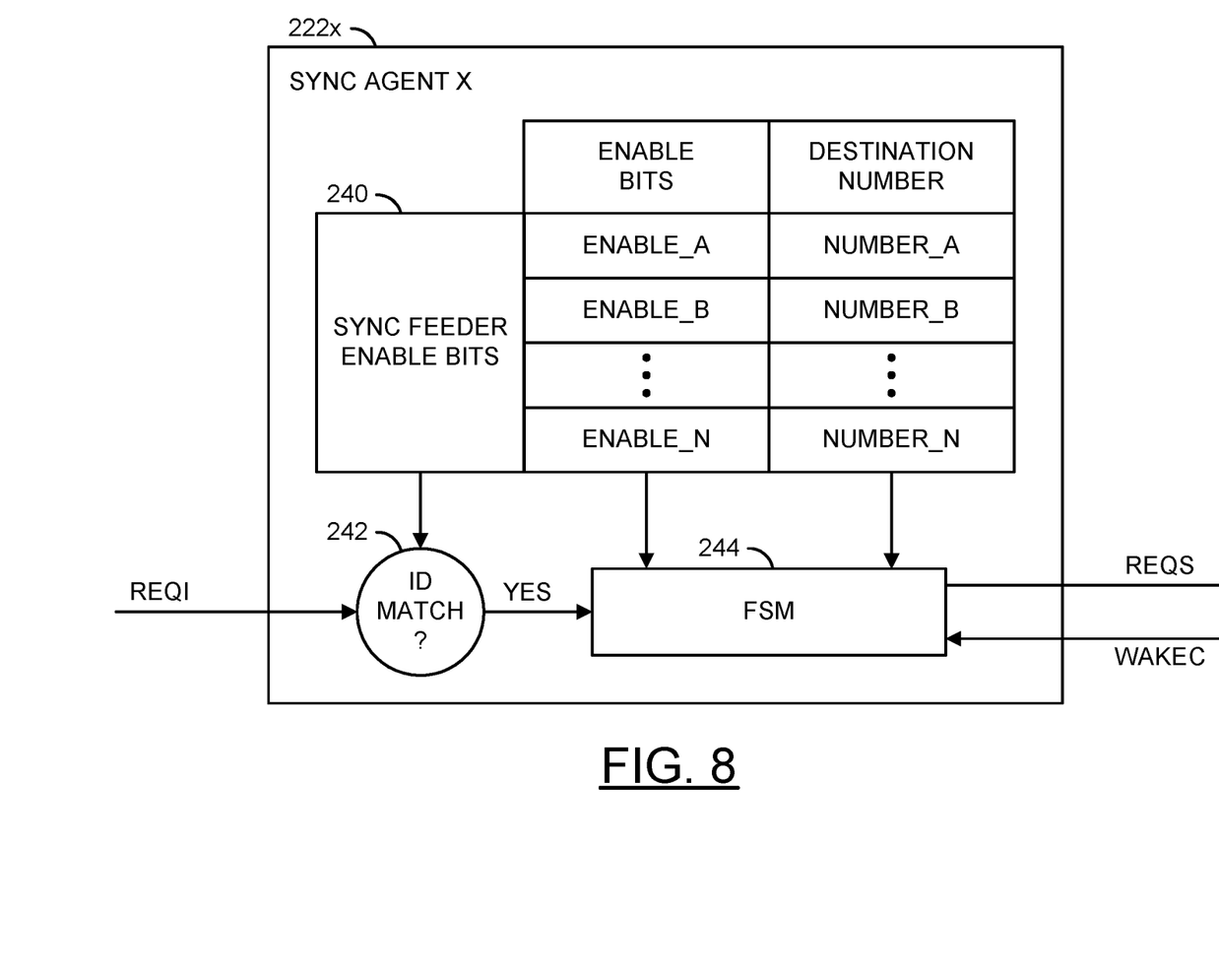
FIG. 8 is a block diagram of a synchronization feeder agent.

Referring to FIG. 8, a block diagram of an example implementation of a circuit 222x is shown. The circuit 222x may be representative of each circuit 222a-222n. One or more registers 240 may store configuration information for the circuit 222x. The configuration information may include, but is not limited to, synchronization feeder enable bits, synchronization counter enable bits (e.g., ENABLE_A to ENABLE_B) and destination synchronization counter numbers (e.g., NUMBER_A to NUMBER_N).

Setting a synchronization feeder enable bit to an enable state (e.g., a logical one state) generally enables the circuit 222x to perform initial increment-wait requests, snoop for decrement request operations, and perform subsequent increment-wait requests. Setting the synchronization feeder enable bit to a disabled state (e.g., a logical zero) generally disables the circuit 222x (e.g., the sync feeder agent may be inactive or unused). The disabled state may be a default state of each circuit 222x after a system reset or power-on or power-off.

Since one or more of the circuits 222a-222n may be used to feed multiple (various) input streams/pipeline sections (e.g., increment multiple sync counters), the synchronization counter enable bits ENABLE_A to ENABLE_N may control the number of input streams (e.g., the circuits 146a-146n and 148) that the circuit 222x may feed/increment for the particular application/operating mode. The destination numbers (or fields) NUMBER_A to NUMBER_N may identify the synchronization counter circuits 162a-162n that the circuit 222x may control (e.g., increment). The destination numbers NUMBER_A to NUMBER_N may store the synchronization counter numbers used by the input streams that share/receive the same data stream from the memory circuit 110. Setting a synchronization counter enable bit ENABLE_A to ENABLE_N to an active state (e.g., the logical one state) generally means that the circuit 222x may increment the synchronization counter number specified (or programmed) in the corresponding NUMBER_A to NUMBER_N field. Setting the synchronization counter enable bit ENABLE_A to ENABLE_N to an inactive state (e.g., the logical zero state) generally means that the circuit 222x may disregard (or ignore) the corresponding NUMBER_A to NUMBER_N field. For example, setting bit ENABLE_A to active may enable the circuit 222x to perform the increment-wait operation on a particular synchronization counter circuit 126a-126n having an identification number specified in the NUMBER_A field. Setting the bit ENABLE_A to inactive generally disables the circuit 222x from performing any increment-wait operation on the particular synchronization counter circuit 162a-162n having the identification number specified in the NUMBER_A field.

A comparison circuit 242 may compare the incoming requests in the signal REQI with the identification (e.g., ID) numbers of the circuits 162a-162n. If an identification number in a request does not match any enabled synchronization counter circuit number associated with the circuit 222x, the request may be ignored and bypasses the circuit 200. If the identification number in a request matches an enabled synchronization counter circuit number, the request is intended for the circuit 222x and may be acted upon. Hence, a finite state machine (e.g., FSM) 244 may send one or more increment-wait requests in the signal REQS. The increment-wait requests may be directed to one or more enabled target circuits 162a-162n. The finite state machine 244 may also collect the wake instructions received in the signal WAKEC from the circuit 142.

Figure 9:
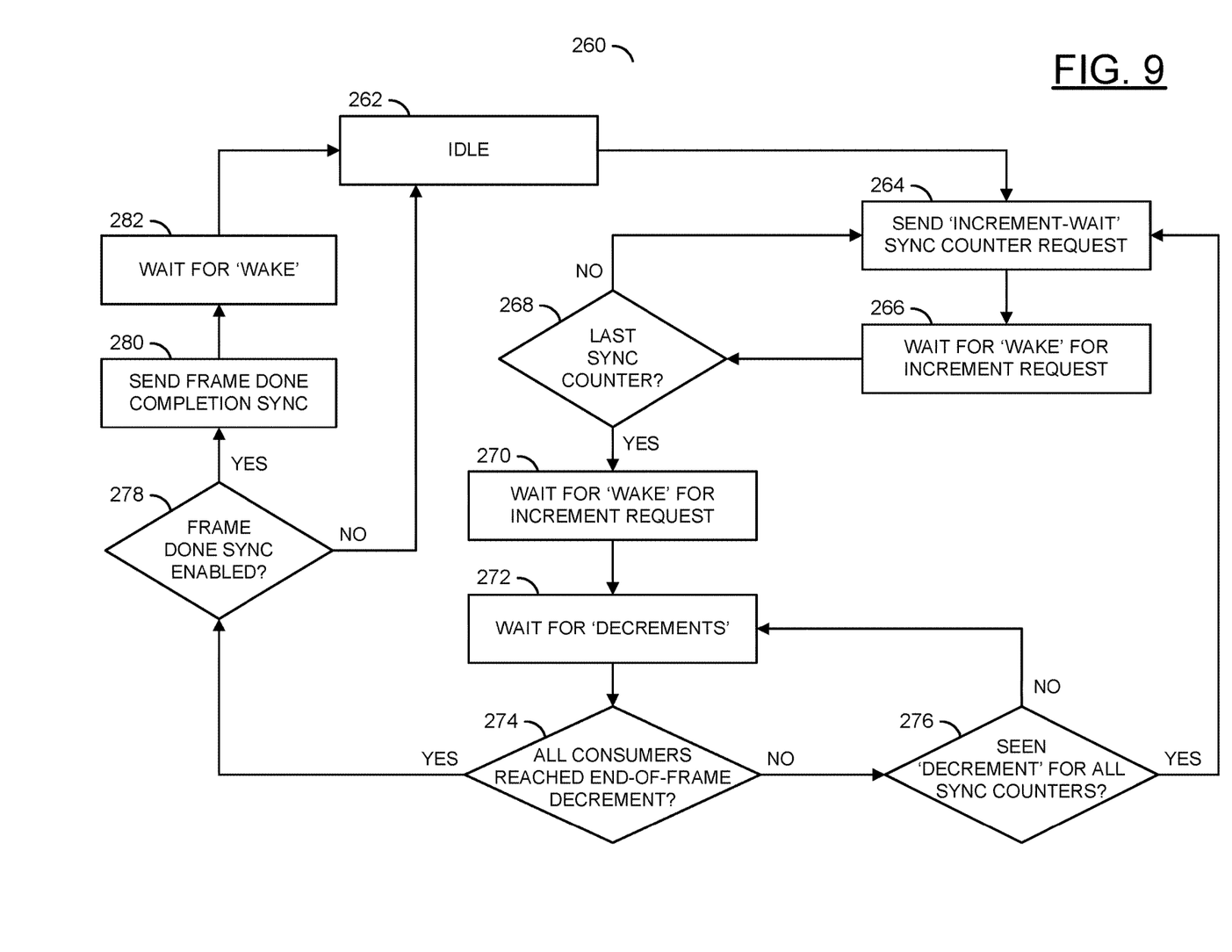
FIG. 9 is a flow diagram of sequence of operations in a synchronization feeder agent.

Referring to FIG. 9, a flow diagram of an example sequence of operations 260 in the circuit 200 is shown. The sequence (or method or process) 260 generally comprises a step (or state) 262, a step (or state) 264, a step (or state) 266, a decision step (or state) 268, a step (or state) 270, a step (or state) 272, a decision step (or state) 274, a decision step (or state) 276, a decision step (or state) 278, a step (or state) 280 and a step (or state) 282. The steps 262-282 may be implemented in hardware, software, firmware or any combination thereof in an apparatus (or device).

Software executing in the circuit 102 generally configures the on-chip stream buffer channels, a channel for each receiving image processor pipeline section input stream, and links a master pipeline (e.g., 146b) of the pipelines 146a-146n to the DRAM channel. The master pipeline 146b may automatically fetch data from the off-chip memory 110 into the on-chip circuit 140 as the on-chip stream buffer data is consumed. The input stream/channel that has the DRAM channel enabled may be referred to as a master channel. All of the other input streams/channel may not have the DRAM fetch enabled and so use the same data fetched by the master channel into the circuit 140. Any input stream/channel may be designated as the master channel.

The software may initially allocate N+2 units of buffer space in the circuit 140 and prefetch the first N+1 units of data into the circuit 140. The value N may be the maximum allowed skew between the input streams that share data for that particular application or operating mode. The value N may be zero if no skew is specified between the streams. The software may configure the circuits 162a-162n (one for each receiving section) with a maximum allowed count value to N+1. Afterwards, the software generally issues an image/video processing command to the pipelines 146a-146n and 148 and initiates the processing. The circuit 200 may be configured by the software with an initial synchronization counter increment value of N+1.

Each receiving pipeline 146a-146n and 148 may generate a receive-wait request for the respective circuits 162a-162n and wait for the corresponding wake instruction to be returned from the circuit 142. Each circuit 222a-222n generally begins in an idle state in the step 262. Upon initialization or receipt of a new command, a selected circuit (e.g., 222a) of the circuits 222a-222n may issue the increment-wait request for a target circuit (e.g., 162a) of the circuits 162a-162n in the step 264. The increment-wait request generally bumps the counter value of the target circuit 162a up to the programmed initial credit amount N+1. In the step 266, the selected circuit 222a may wait for the target circuit 162a to respond to the increment request with the wake instruction.

Once the target circuit 162a issues the wake instruction, the selected circuit 222a may check for a last of the counters in the decision step 268. If the current target counter is not the last of the enabled target counters 162a-162n, the method 260 may return to the step 264 and issue another increment-wait request for a next counter (e.g., circuit 162b). The loop around the steps 264, 266 and 268 may continue for each target circuit 162a-162n enabled in the selected circuit 222a. In the step 270, the selected circuit 222a may wait for a last (e.g., the circuit 162k) of the enabled circuits 162a-162n to issue the wake instruction in response to the increment request.

As the target counters 162a-162n receive the increment-wake requests, the target counters 162a-162n may issue wake instructions to the pipelines 146a-146n and 148 that sent the earlier receive-wait requests. Once the circuit 142 responds to the receive-wait requests, the target pipelines 146a-146n and 148 generally start processing an initial unit of data from the circuit 140. The master channel may automatically perform a back fill into the circuit 140 for additional data units (e.g., 1 or 2 units), depending on the initial prefetch amount.

In the step 272, the selected circuit 222a may wait for all of the enabled pipelines 146a-146n and 148 to consume the current buffered data units and issue a decrement request for the respective circuits 162a-162n. Each pipeline 146a-146n and 148 may generate a decrement request after consuming the current buffered data unit and generate a receive-wait request before starting to work on the next buffered data unit.

The circuit 200 generally blocks the pipelines 146a-146n and 148 (unless an additional buffer credit is allocated, for example, N>0) at a beginning of each subsequent buffered data unit by delaying the issue of the next increment-wait requests to the enabled target circuits 162a-162n. The next increment-wait requests may be delayed until all of the pipelines 146a-146n and 148 complete processing on the current buffered data unit and issue the decrement request on the bus 144 to indicate a readiness to start working on the next buffered data unit. The selected circuit 222a generally snoops the decrement requests on the bus 144. Delaying presentation of the increment-wait requests to the target circuits 162a-162n generally guarantees that: the master channel/section does not run ahead and overwrite the current buffered data unit before other channels consume the current buffered data unit; and the slave channels/sections do not run ahead of the master channel and cause a buffer underflow (e.g., try to access the next data unit before the back fill DMA transfer completely copies the next data unit into the circuit 140).

In the decision step 274, the selected circuit 22a may check if all of the target pipelines 146a-146n have issued an end-of-frame (e.g., EOF) decrement request. If not, the selected circuit 222a may check in the decision step 276 if all of the target pipelines 146a-146n have issued a regular decrement request. If not, the method 260 may return to the step 272 to continue to wait. Once all of the target pipelines 146a-146n have issued a decrement request, the selected circuit 222a may issue the increment-wait requests in the step 264 for all of the target circuits 162a-162n, to bump the counters up by a unit (e.g., 1).

The method 260 may continue through the steps 264, 266, 268 to the step 270 where the selected circuit 222a issues the increment-wake requests to the enabled target circuits 162a-

162*n*. Upon receiving the wake instructions issued by the bumped-up circuits 162*a*-162*n* in response to the receive-wait requests, the target pipelines 146*a*-146*n* generally start processing the next data unit, for example data unit N, and the master channel may automatically back fill additional data units N+M into the circuit 140, where M may be a number of data units of data prefetched by software initially.

The steps 264-276 may be repeated until the target pipelines 146*a*-146*n* signal an end-of-frame decrement request to the target circuits 162*a*-162*n*. The selected circuit 222*a* may respond to the end-of-frame decrement requests by checking for an enabled frame done synchronization flag in the decision step 278. If the frame done synchronization flag is configured as disabled, the method 260 may return to the step 262 and wait for a next command to start processing a next frame. If the frame done synchronization flag is configured as enabled, the selected circuit 222*a* may send a frame done completion synchronization instruction to the software in the step 280. In the step 282, the selected circuit 222*a* may wait for another wake instruction. Once the wake instruction has been received, the method 260 may return to the idle state in the step 262. The method 260 may be implemented independently in each of the circuits 222*a*-222*n*.

Figure 10:
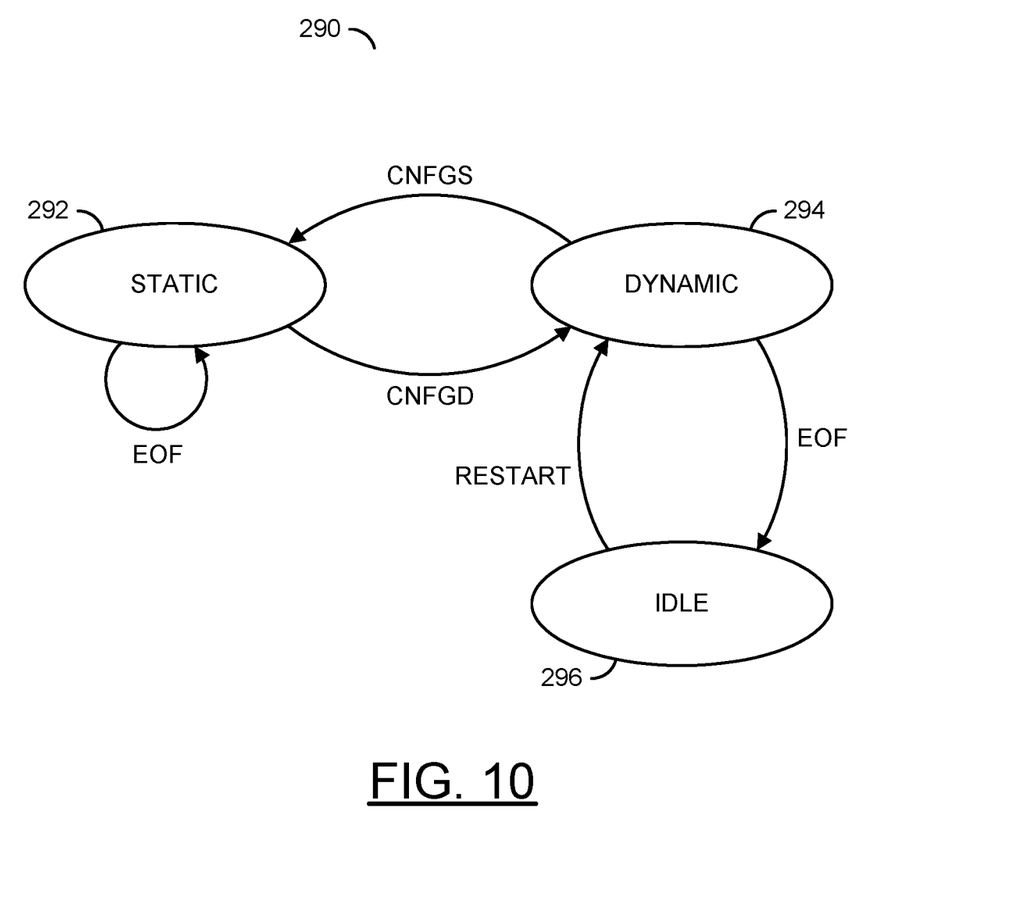
FIG. 10 is a state transition diagram.

Referring to FIG. 10, a state transition diagram 290 of each circuit 222*a*-222*n* is shown. The state transition diagram 290 generally comprises a state (or mode) 292, a state (or mode) 294 and a state (or mode) 296. The states may be implemented in hardware.

The circuit 200 generally works as a co-processor to the processor shown in FIG. 1. The software running in the circuit 102 configures and starts the circuit 200 by issuing co-processor instructions/commands to the circuit 200. The circuit 200 may interface with most standard co-processor interface methods. The methods may include, but are not limited to, memory mapped addressing, instruction/command first-in-first-out buffering, and direct wiring. When the circuit 102 implements an array of the circuits 200, each circuit 200 may be configured and operated independently.

The circuit 200 generally defines multiple states of operation, namely the static state 292, the dynamic state 294 and the idle state 296. In the dynamic state 294, the software may issue a new command/instruction to the circuit 200 to reconfigure and restart the circuits 222*a*-222*n* for every image/video frame. When an end-of-frame condition is reached, a circuit 222*a*-222*n* may transition from the dynamic state 294 to the idle state 296. In the idle state 296, the circuit 222*a*-222*n* may wait for a restart command. In the static state 292, the software may not issue a new command/instruction to the circuit 200 for every frame. Rather, the software may issue a new command/instruction to re-map/change any settings of the circuit 200, or change the counter numbers. Otherwise, the circuit 200 may continue to process image/video frames without software intervention.

The software may change the circuit 200 from the static state 292 to the dynamic state 294 with a configuration command (e.g., CNFGD). The states may be changed from the dynamic state 294 to the static state 292 with another configuration command (e.g., CNFGS). The static state 292 is useful for high frame rate video applications so that the embedded processor is not burdened with changing settings or modes of the circuit 200 for every video frame. The static state may be useful for high resolution digital still camera and picture-in-video (e.g., PIV) hybrid camera applications. In the high resolution digital camera applications, the image processor pipeline may partition a captured still image into multiple slices and interleave the processing of slices between the preview frames. Hence, the pipeline sections 146*a*-146*n* and the circuit 200 may be re-configured/re-mapped for every frame. In the picture-in-video mode, the hybrid camera may capture and process still pictures while recording video (e.g., the image processor may interleave the still picture processing between the video frame processing). Therefore, the circuit 200 and the pipeline sections 146*a*-146*n* and 148 may be re-configured for every frame.

Embodiments of the present invention may work with existing camera circuitry (e.g., a silicon-on-a-chip circuit), image and video processors, digital camera architectures and digital camera implementations. The synchronization feeder circuit may be transparent to the processor pipeline sections that produce and consume the data units, so no design changes may be implemented to interface to the existing image/video processor pipelines sections, and synchronization counters. Some embodiments of the invention may scale to any number of processor pipeline sections (or input streams) that share a data stream from the external DRAM. Each synchronization feeder agent may be completely re-configurable and may be re-mapped to any image pipeline sections of the input stream.

Embodiments of the present invention generally operate independent of the other processors to continuously monitor the synchronization feeder agents and may not track the image/video frame progress and re-configuration. The synchronization feeder agents may report a frame completion through interrupts and/or dedicated frame level synchronization counters to the application software running on the processor.

Some embodiments generally allow the input streams that share data units to run (consume) with varying skews with respect to each other. The maximum amount of skew allowed may be configurable by software based on the application criteria by adjusting the elasticity buffer (e.g., on-chip stream buffer) size.

The functions and structures illustrated in the diagrams of FIGS. 1-10 may be designed, modeled and simulated using one or more of a conventional general purpose processor, digital computer, microprocessor, microcontroller and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example a non-transitory storage media, and may be executed by one or more of the processors. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   an interface connectable to (i) a plurality of counters and (ii) a plurality of image pipelines each (a) associated with one of said counters and (b) configured to use a set of common video frame data retrieved from a buffer; and a circuit configured to (i) initialize two or more of said counters with an initial value based on a maximum allowed skew between streams of the common video frame data, (ii) monitor decrements of said counters, (iii) prevent additional data from being copied into said buffer until each of said counters indicate that said buffer has room to hold said additional data and (iv) avoid both an over run and an under run while allowing the plurality of image pipelines to use said common video frame data with different skews with respect to each other, wherein said decrements of said counters are in response to a processed data unit of the video frame data from a respective one of said image pipelines.

2. The apparatus according to claim 1, wherein (i) said circuit is implemented in only hardware and (ii) said counters associated with said image pipelines that are using said common video frame data are less than all of said counters.

3. The apparatus according to claim 1, wherein said circuit is further configured to receive a plurality of wake signals from said counters associated with said image pipelines that are using said common video frame data at a plurality of different times.

4. The apparatus according to claim 3, wherein said circuit is further configured to enable said image pipelines to process a second data unit after all of said wake signals from said counters associated with said image pipelines that are using said common video frame data have been received.

5. The apparatus according to claim 1, wherein (i) said circuit is configured to associate a first number of said counters associated with said image pipelines that are using said common video frame data with a second number of first data units, and (ii) one of said counters for each one of said image pipelines is allocated to process said first data units.

6. The apparatus according to claim 5, wherein said circuit is configured to associate a third number of said counters with a fourth number of second data units.

7. The apparatus according to claim 1, wherein said circuit is further configured to (i) idle operation in response to an end of frame while said circuit is in a dynamic state and (ii) resume operation in response to a command.

8. The apparatus according to claim 7, wherein said circuit is further configured to continue said operation after said end of frame while said circuit is in a static state.

9. The apparatus according to claim 1, wherein said circuit is part of a digital camera.

10. A method for data unit feed synchronization to multiple image pipelines, comprising the steps of:
initializing two or more counters with an initial value based on a maximum allowed skew between streams of common video frame data associated with a plurality of image pipelines reading common video frame data from a buffer, wherein one of said counters is decremented in response to a processed data unit of the video frame data from a respective one of said image pipelines;
monitoring said decrements of said counters;
preventing additional data from being copied into said buffer until each of said counters indicate that said buffer has room to hold said additional data; and
avoiding both an over run and an under run while allowing the plurality of image pipelines to use said common video frame data with different skews with respect to each other.

11. The method according to claim 10, wherein (i) said method is implemented in only hardware and (ii) said counters associated with said image pipelines that are reading said common video frame data are less than all of said counters.

12. The method according to claim 10, further comprising the step of:
receiving a plurality of wake signals from said counters associated with said image pipelines that are reading said common video frame data at a plurality of different times.

13. The method according to claim 12, further comprising the step of:
enabling said image pipelines from processing a second data unit after all of said wake signals from said counters associated with said image pipelines that are reading said common video frame data have been received.

14. The method according to claim 10, further comprising the step of:
associating a first number of said counters associated with image pipelines reading said common video frame data with a second number of first data units, wherein one of said counters for each one of said image pipelines is allocated to process said first data units.

15. The method according to claim 14, further comprising the step of:
associating a third number of said counters with a fourth number of second data units.

16. The method according to claim 10, further comprising the steps of:
idling an operation in response to an end of frame while in a dynamic state; and
resuming said operation in response to a command.

17. The method according to claim 16, further comprising the step of:
continuing said operation after said end of frame while in a static state.

18. The method according to claim 10, wherein the steps are implemented in a digital camera.

* * * * *